United States Patent [19]
Saitou

[11] Patent Number: 5,007,241
[45] Date of Patent: Apr. 16, 1991

[54] KINETIC ENERGY RECOVERY DEVICE OF LIQUID AND GAS

[76] Inventor: Yutaka Saitou, 24-25, 1-chome, Kikui, Nishi-ku, Nagoya-shi, Aichi-ken, Japan

[21] Appl. No.: 406,397
[22] Filed: Sep. 12, 1989
[51] Int. Cl.⁵ .................. F01B 21/04; F02B 73/00
[52] U.S. Cl. ........................... 60/698; 60/398; 415/62; 415/66
[58] Field of Search ............ 415/62, 66; 60/698, 60/716, 718, 398; 790/1 R, 53, 54, 55

[56] References Cited

U.S. PATENT DOCUMENTS

| | | | |
|---|---|---|---|
| 1,054,710 | 3/1913 | Olson | 60/639 |
| 1,811,565 | 6/1931 | Schwabacher | 60/698 |
| 4,023,041 | 5/1977 | Chappell | 290/53 |
| 4,096,698 | 6/1978 | Martin | 60/641.12 |
| 4,488,055 | 12/1984 | Toyama | 290/53 |

FOREIGN PATENT DOCUMENTS

| | | |
|---|---|---|
| 50-84311 | 7/1975 | Japan . |
| 61-191809 | 8/1986 | Japan . |
| 61-192861 | 8/1986 | Japan . |
| 61-192863 | 8/1986 | Japan . |

*Primary Examiner*—Allen M. Ostrager
*Attorney, Agent, or Firm*—Armstrong, Nikaido, Marmelstein, Kubovcik & Murray

[57] ABSTRACT

A kinetic energy recovery device of liquid and gas has a gas guide member and a liquid guide member both being stood, and a vane wheel installed at communicating portion between the gas guide member and the liquid guide member, and at rising of gas in the gas guide member and flowing-down of liquid in the liquid guide member, the vane wheel is supplied with the rotating force and therefore rotated. A generator connected to a rotary shaft of the vane wheel is rotated, and both kinetic energies of the gas and the liquid act simultaneously and the power generation is performed and the energy is recovered. The vane wheel is installed to each of the gas guide member and the liquid guide member, and the rotary shafts of respective vane wheels are interlocked and rotated simultaneously, thereby the generator may be rotated by both kinetic energies of the gas and the liquid.

10 Claims, 5 Drawing Sheets

KINETIC ENERGY RECOVERY DEVICE OF LIQUID AND GAS

BACKGROUND OF THE INVENTION

The present invention relates to a kinetic energy recovery device for liquid and gas.

In the prior art, a recovery device of kinetic energy of air flow as disclosed in Japanese patent application Laid-open No. 191809/1986, is provided with arbitrary number of vane wheels rotating when gas flow rising within a cylindrical hollow body is received on the vanes, thereby a generator is driven by the rotating force of the vane wheels.

Also as disclosed in Japanese patent application Laid-open Nos. 192861/1986 and 192863/1986, arbitrary number of vane wheels are installed and rotate when liquid flow within a tube transferring downward the liquid pumped up to a higher position by a liquid pump is received on the vanes, thereby a generator is driven by the rotating force of the vane wheels.

However, any device cannot recover the kinetic energy of liquid and the kinetic energy of gas at the same time using the same means.

SUMMARY OF THE INVENTION

In a kinetic energy recovery device of liquid and gas according to the invention, a gas guide member and a liquid guide member are stood, and vane wheels are installed at a communication portion between the gas guide member and the liquid guide member, and at rising of gas within the gas guide member and flowing-down of liquid within the liquid guide member, the vane wheels are supplied with the rotating force and therefore rotated. The rotation of the vane wheels is transmitted to an energy recovery means which recovers both kinetic energies of gas and liquid at the same time. The vane wheels are installed to the gas guide member and the liquid guide member respectively, and the rotary shafts of the respective vane wheels are connected and rotated at the same time, thereby the generator can be rotated by both kinetic energies of gas and liquid.

An object of the invention is to provide a kinetic energy recovery device of liquid and gas wherein kinetic energy of liquid and kinetic energy of gas can be recovered at the same time using the same device, and these energies lost uselessly can be recovered efficiently.

DESCRIPTION OF THE PREFERRED EMBODIMENTS

Figure 1:
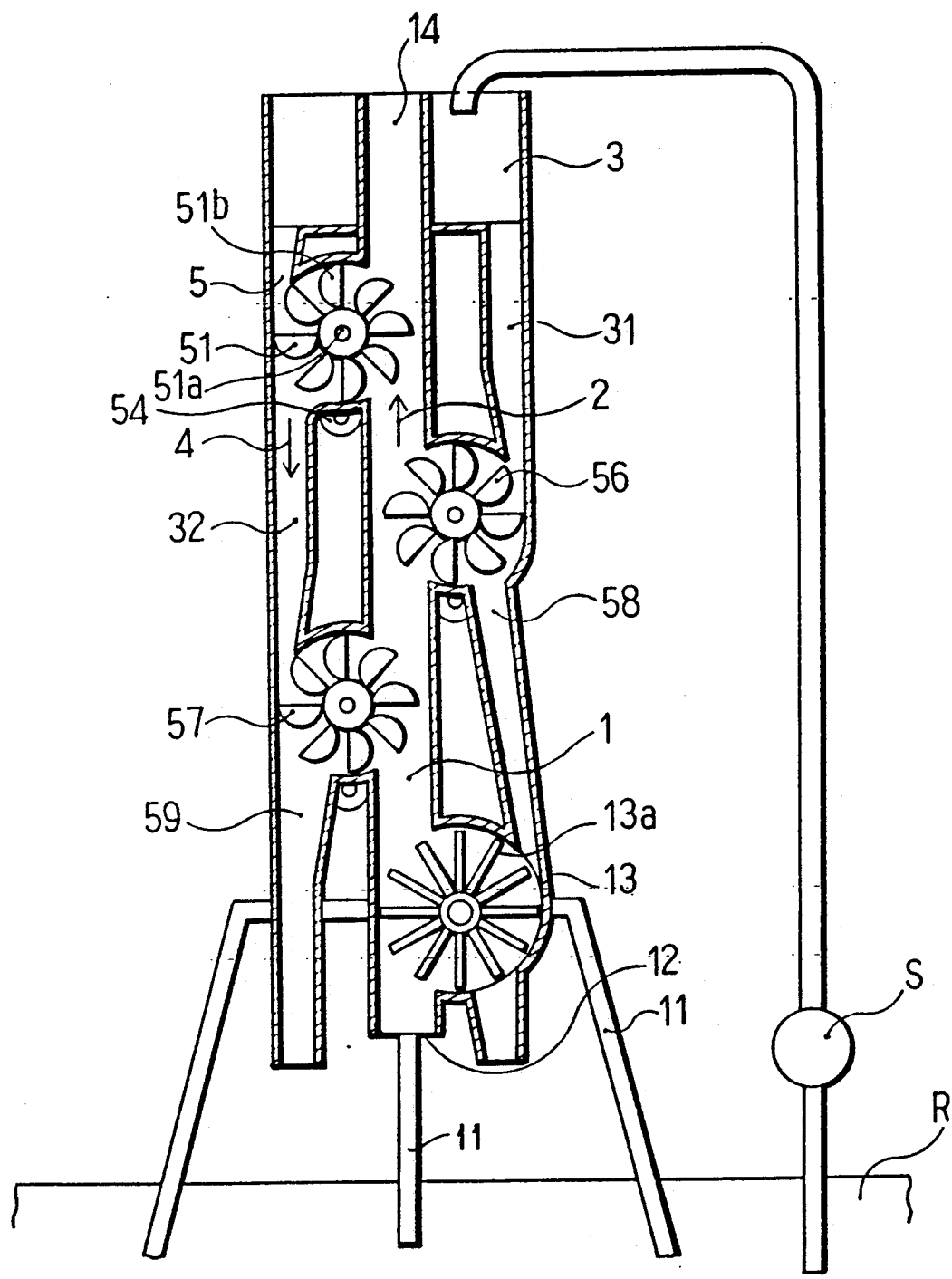
FIG. 1 is a longitudinal sectional view of a first embodiment in a kinetic energy recovery device.

FIG. 1 shows a first embodiment of a kinetic energy recovery device. In FIG. 1, a gas guide member 1 is arranged longitudinally towards upper side, and the end upper is opened as an exhaust port 14 which serves as guide of the exhaust gas or the rising current of gas entering from entry port 12, and is supported by a support legs 11 so as to be fixed or floated on a lake, a river, a sea, a liquid vessel or the like. A liquid vessel 3 (first liquid storage member) is provided on both sides of the upper portion of the air guide member 1, and liquid guide member 31, 32 are provided downward from the liquid vessel 3 and longitudinally on both sides of the gas guide member 1 so that the liquid from the liquid vessel 3 flows down.

Two communication portions are provided on different levels respectively between the gas guide member 1 and the liquid guide member 31, 32 on both sides thereof, and rotary shafts of vane wheels 56, 13a and vane wheels 51, 57 are installed there rotatable laterally with respect to the longitudinal direction of both guide members. Liquid in the liquid vessel 3 passes through the liquid guide members 31, 32 and flows down in the direction of the arrow 4 out through liquid exhaust ports 58, 59 to a liquid storage member R for a lake, a river, a sea, a liquid vessel or the like at downward side so that each of the vane wheels 13a of the blowing member 51, 56, 57 is rotated. Further, a pumping-up means S such as a pumping-up pump is installed between the liquid storage member R and the liquid vessel 3 so that liquid is pumped up into the liquid vessel. The support leg 11 may be installed to a floating body or fixed by using a chain.

Figure 2:
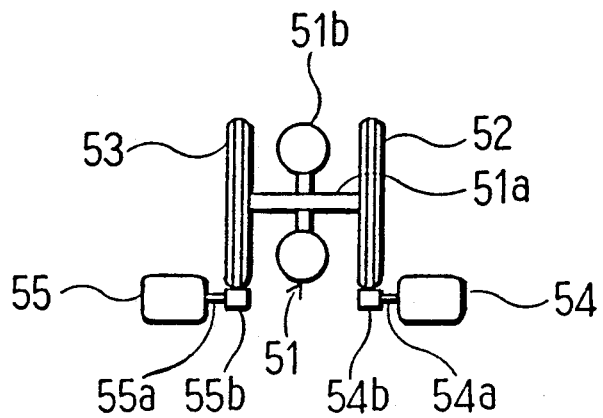
FIG. 2 is a plan view of a vane wheel, a flywheel and a generator in the kinetic energy recovery device.

As shown in FIG. 2, a kinetic energy storage member 5 comprises a pair of flywheels 52, 53, fitted to the rotary shaft 51a of the vane wheel 51, and generators 54, 55 driven by the flywheels 52, 53. Vanes 51b of the vane wheels 51 receive separately kinetic energy of the rising gas flow and the floating liquid in the direction of the arrow 2 so as to obtain the rotating force of the vane wheel 51. Further, the vane wheels 56, 57, 13a are rotated in similar manner to the vane wheel 51.

The flywheels 52, 53 are rotated in the coaxial relation with the vane wheel 51, and reduce variation of the rotating speed due to irregularity of the rotating force and also reduce variation of the generating voltage of the generators 54, 55. Frictional wheels 54b, 55b fitted respectively to the top end of rotary shaft 54a, 55a of the generators 54, 55 abut on the outer circumference of the flywheels 52, 53, and the rotary shafts 54a, 55a of the generators 54, 55 are rotated by the rotation of the flywheels 52, 53 so as to perform the power generation.

Figure 3:
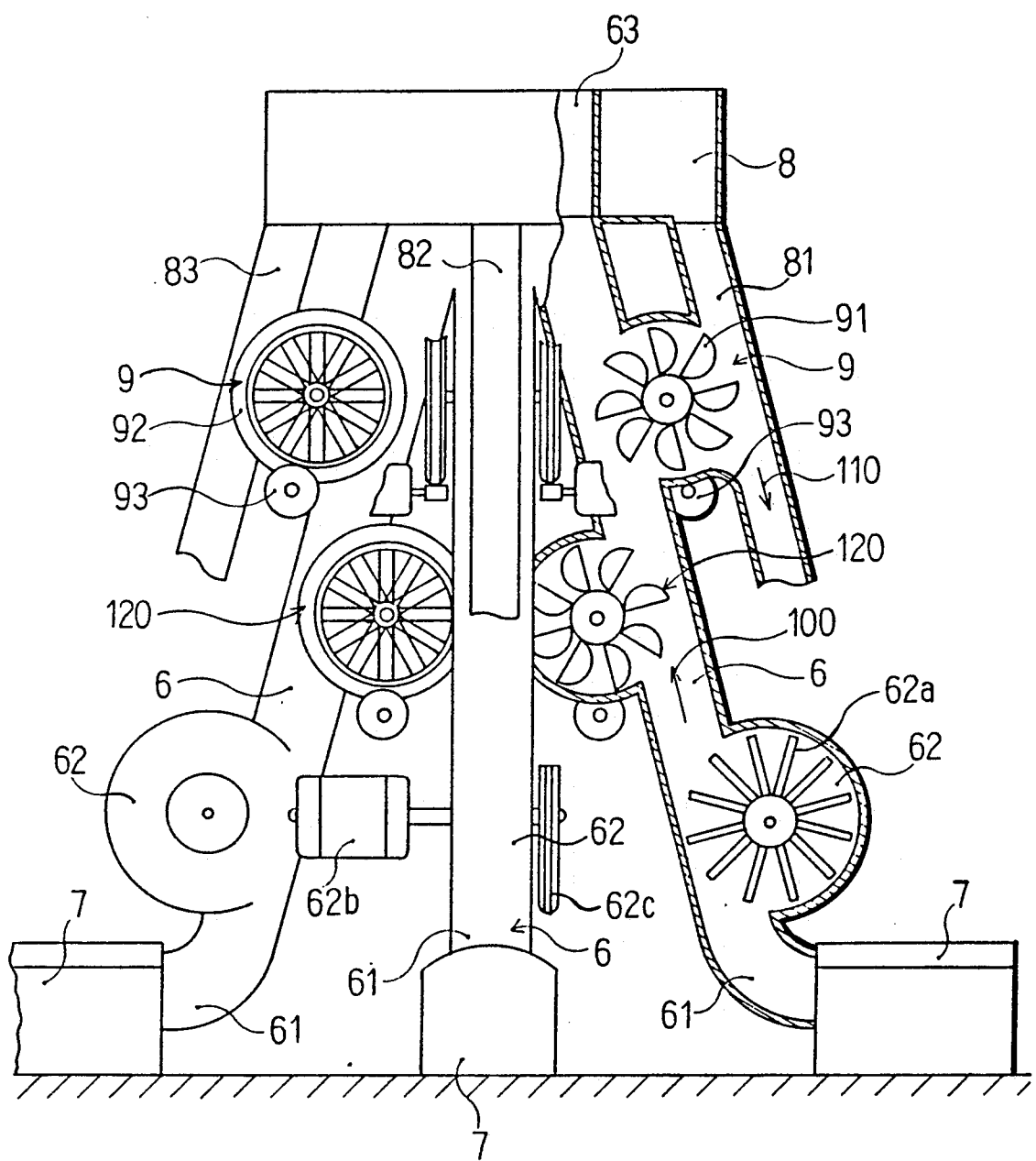
FIG. 3 is a front view partly in section of a second embodiment of a kinetic energy recovery device.

FIG. 3 shows a second embodiment of the invention. In FIG. 3, each gas guide member 6 is connected at its base portion to an exhaust member 7 of a combustion device or the like, and arranged towards oblique upward direction. A blowing member 62 for forced gas exhaust is installed in the vicinity of an inlet 61 of the gas guide member 6, and a vane wheel 62a of the blowing member 62 is driven by a motor 62b. An exhaust port 63 on the upper side of each gas guide member 6 is integrated to one position. The vane wheel 62a driven by the motor 62b through a flywheel 62c, and when the exhaust amount from the exhaust member 7 is sufficiently large, the blowing member 62 may be optional.

A liquid vessel 8 for enclosing liquid is formed surrounding the vicinity of the exahust port 63 of the gas guide member 6, and liquid guide members 81, 82, 83 are installed to the lower side of the liquid vessel 8 corresponding to the gas guide member 6. A plurality of communication portions are formed between each gas guide member 6 and each of the liquid guide members 81, 82, 83, and a kinetic energy recovery member 9 is installed there. A vane wheel 91 rotated by a rising gas flow 100 and a falling liquid flow 110 is supported to the kinetic energy recovery member 9 by the rotary shaft in the lateral direction.

In the energy recovery device with such structure, liquid flows down from the inside of the liquid vessel 8 through the liquid guide members 81, 82, 83 thereby the vane wheel 91 is rotated and driven, and at the same time the vane wheel 91 is rotated and driven by the exhaust gas flow rising in the gas guide member 6. The rotation of the vane wheel 91 is transmitted through a flywheel 92 to a generator 93, and the generator 93 is rotated thereby the power generation is performed. Also a vane wheel of an energy recovery member 120 is rotated and driven by only the rising exhaust gas thereby the power generation is performed. The kinetic energy recovery member 120 may be similar to the kinetic energy recovery member 9. The kinetic energy recovery member 120 may be optional, and the gas guide members may be arbitrarily connected thereto and the liquid vessel 8 may be shifted and the vane wheel 91 may be directed to the just reverse direction and the gas flow 100 and the liquid flow 110 may be reversed arbitrarily.

Figure 4:
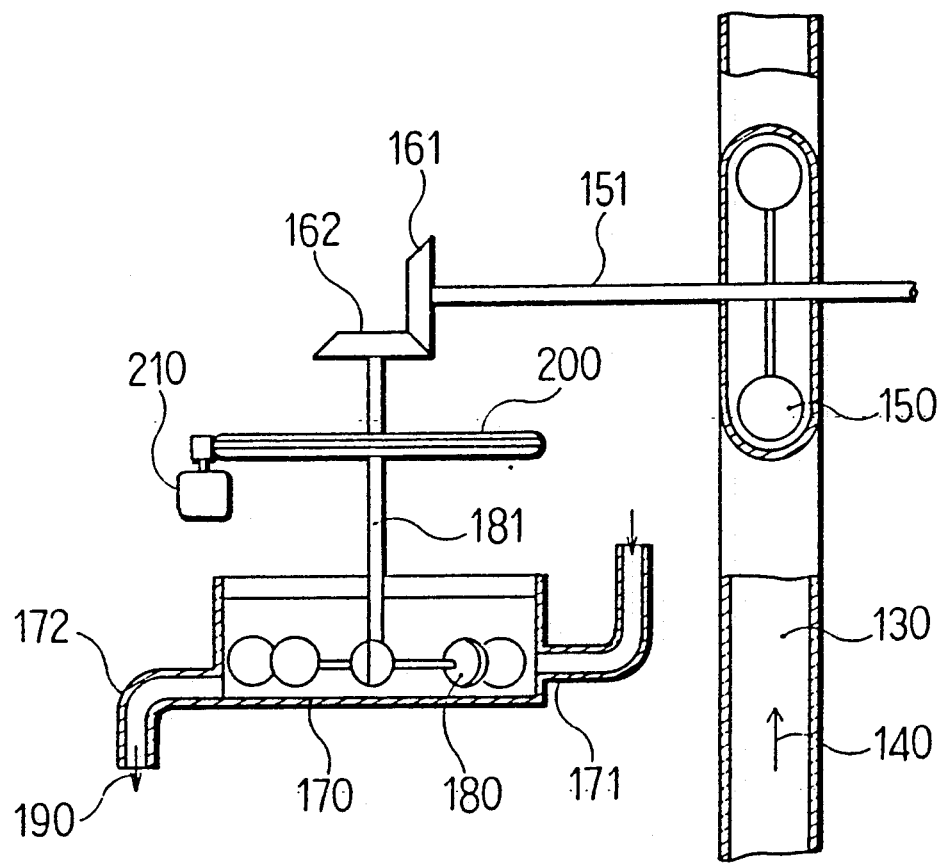
FIG. 4 is a partial sectional view of another embodiment of a kinetic energy recovery device.

FIG. 4 shows another embodiment. In FIG. 4, a gas guide member 130 is provided at its wide portion with a vane wheel 150 obtaining the rotating force of a rising gas flow 140 and installed at the shaft shifted relation. A bevel gear 161 is fitted to the top end of a rotary shaft 151 of the vane wheel 150 and meshed with a bevel gear 162.

A vane wheel 180 is installed in a liquid vessel 170, and obtains the rotating force by kinetic energy of a falling liquid flow 190. Liquid guide members 171, 172 are connected to the liquid vessel 170, and a flywheel 200 is fitted to a rotary shaft 181 of the vane wheel 180 and a generator 210 is driven by the flywheel 200. The bevel gear 162 is fixed to the top end of the rotary shaft 181, and the rotating force from the vane wheel 150 is transmitted through the bevel gear 161 engaged with the bevel gear 162 to the flywheel 200. Consequently, the driving force of the generator 210 becomes addition of the rotating force of the vane wheel 150 and the rotating force of the vane wheel 180, and the generator 210 is rotated by the driving force and therefore the power generation is performed.

Figure 5:
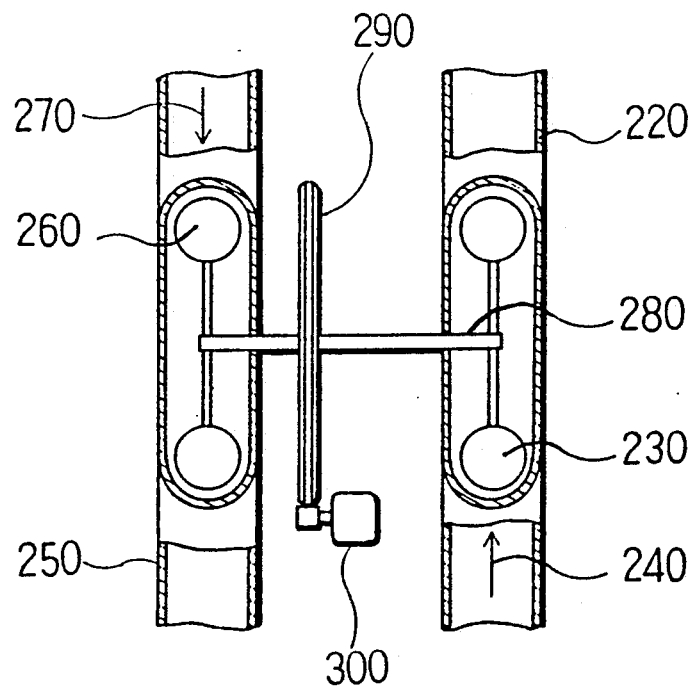
FIG. 5 is a partial sectional view of still another embodiment of kinetic energy recovery device.

FIG. 5 shows still another embodiment. In this case, a gas guide member 220 for rising a gas and a liquid guide member 250 for flowing down a liquid are arranged in parallel to each other in the vertical direction and in shifted positions in the longitudinal direction nearly by width of the vane wheel. The gas guide member 220 is provided in its wide portion with a vane wheel 230 in the shifted relation of the rotary shaft, and the vane wheel 230 obtains the rotating force by kinetic energy of a rising gas flow 240.

The liquid guide member 250 is provided in its wide portion with a vane wheel 260 in the shifted relation of the rotary shaft, and the vane wheel 260 obtains the rotating force by kinetic energy of a liquid flow 270 falling in the liquid guide member 250. The vane wheels 230 and 260 have a common rotary shaft 280, and a flywheel 290 is fitted to the rotary shaft 280 and a generator 300 is driven by the flywheel 290.

The gas flow 240 rising in the gas guide member 220 rotates the vane wheel 230 in one direction, and at the same time the liquid flow 270 flowing down in the liquid guide member 250 rotates the vane wheel 260 in the same direction, and the generator 300 is rotated and driven through the flywheel 290 thereby the power generation is performed. The driving force of the generator 300 in this case becomes addition of the rotating force of the vane wheel 230 and the rotating force of the vane wheel 260.

The conversion into electric energy by the generator need not be performed, and the added rotating force as it is may be transmitted to a mechanism having other rotating means and the rotation energy can be utilized directly. When the device according to the invention is installed to a position such as a waterfall having a water source at upper side, the water source can be utilized as a liquid vessel and the liquid guide member may be faced with the water source. The generator used in the embodiments may be an AC generator or a DC motor, and its output can be used as a part of input of each of the motors.

Figure 6:
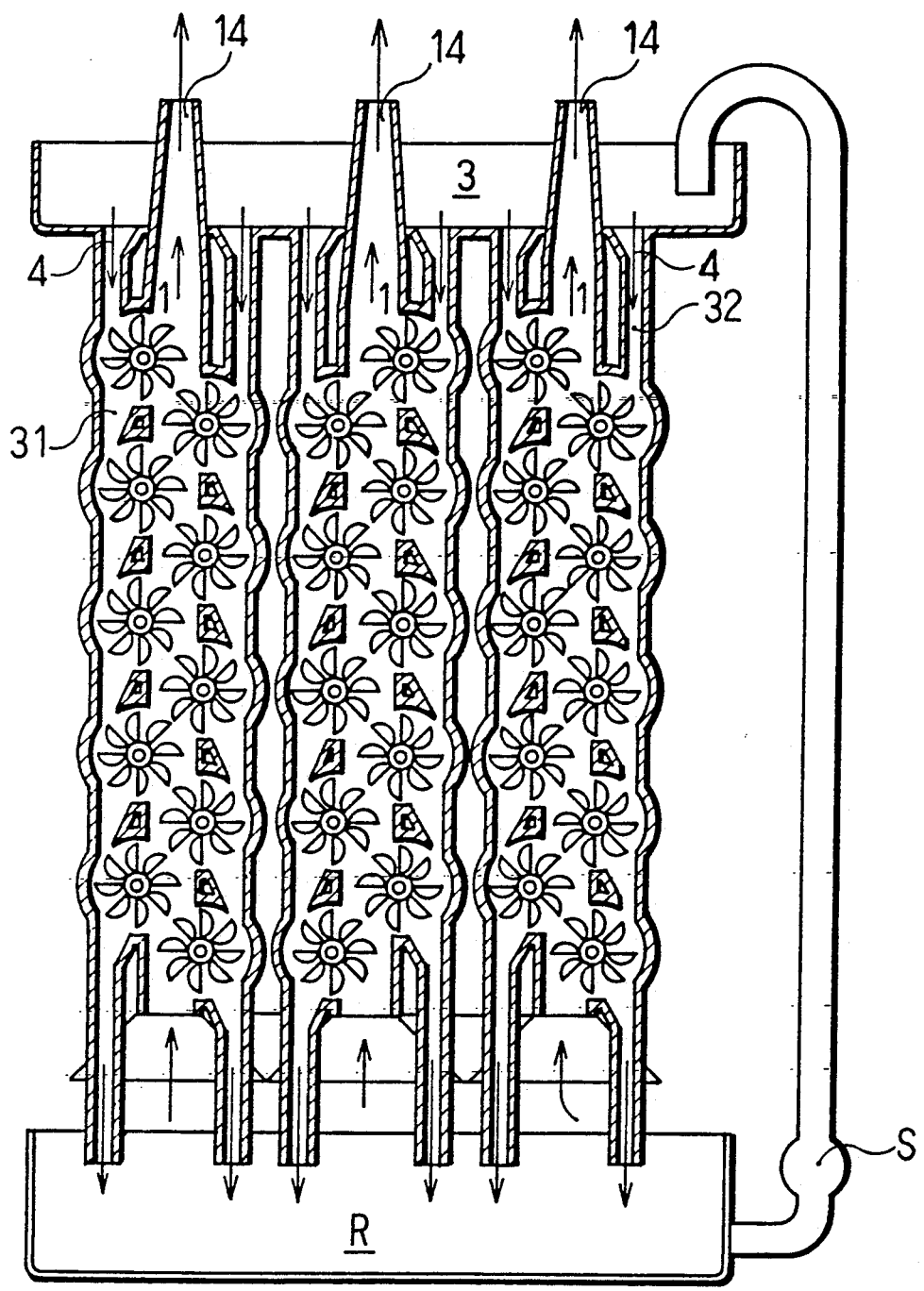
FIG. 6 is partial sectional view of still another embodiment of a kinetic energy recovery device.

A plurality of the guide member and the gas guide member, each shown in FIG. 1, can be arranged in parallel alternately as shown in FIG. 6, and the number and the position of the vane wheels may be increased arbitrarily.

As above described, in the present invention, the rotating force of the vane wheel by the falling liquid flow and the rotating force of the vane wheel by the rising gas flow are added in the kinetic energy recovery member of liquid and gas, and the generator is driven by the added rotating force. Accordingly, the kinetic energy of the liquid flow and the kinetic energy of the gas flow can be recovered at the same time using the same device and converted into electric energy.

What is claimed is:

1. A kinetic energy recovery device comprising:
 (a) a gas guide member;
 (b) a liquid guide member installed along said gas guide member, said gas guide member and said liquid guide member partly communicating with each other;
 (c) a vane wheel supported rotatable by a rotary shaft supported at the communicating portion between said gas guide member and said liquid guide member in the lateral direction with respect to the longitudinal direction of both guide members and rotating on receiving the rotating force from a gas flow rising in said gas guide member and a liquid flowing down in said gas guide member;
 (d) a first liquid storage member installed on the upper end of said liquid guide member;
 (e) a second liquid storage member installed at lower side of said liquid guide member;
 (f) a liquid pumping-up means for pumping up a liquid from said second liquid storage means into said first liquid storage member;
 (g) an energy recovery means; and
 (h) means for transmitting the rotation of said vane wheel to said energy recovery means.

2. A kinetic energy recovery device as set forth in claim 1, wherein said energy recovery means is a generator.

3. A kinetic energy recovery device as set forth in claim 1, wherein said second liquid storage member is a river.

4. A kinetic energy recovery device as set forth in claim 1, wherein said second liquid storage member is a lake.

5. A kinetic energy recovery device as set forth in claim 1, wherein said second liquid storage member is a liquid vessel.

6. A kinetic energy recovery device as set forth in claim 1, wherein said second liquid storage member is a sea.

7. A kinetic energy recovery device as set forth in claim 1, wherein said means for transmitting the rotation of said vane wheel to said energy recovery means is a shaft extended to the rotary shaft of said vane wheel for transmitting the rotation means of said vane wheel directly to an external mechanism.

8. A kinetic energy recovery device as set forth in claim 1, wherein a plurality of gas guide members and a plurality of liquid guide members are integrated at each upper portion and stand obliquely, and a blowing member for rotating said vane wheel and for performing the forced gas exhaust is installed on said gas guide member.

9. A kinetic energy recovery device as set forth in claim 1, wherein a plurality of gas guide members and liquid guide members are arranged alternately and continuously.

10. A kinetic energy recovery device comprising:
(a) a gas guide member;
(b) a liquid guide member installed along said gas guide member, said gas guide member operatively connected with said liquid guide member;
(c) a vane wheel means supported rotatable between said gas guide member and said liquid guide member so as to rotate on receiving the rotating force from a gas flow rising in said gas guide member and a liquid flowing down in said liquid guide member;
(d) a liquid storage member installed on the upper end of said liquid guide member;
(e) an energy recovery means; and
(f) means for transmitting the rotation of said vane wheel means to said energy recovery means.

* * * * *

UNITED STATES PATENT AND TRADEMARK OFFICE
CERTIFICATE OF CORRECTION

PATENT NO.   :   5,007,241
DATED        :   April 16, 1991
INVENTOR(S)  :   Yutaka SAITOU It is certified that error appears in the above-identified patent and that said Letters Patent is hereby corrected as shown below:

On the cover page, Item [76], first line, delee "24-25", and insert therefor -- 24-15 --.

Signed and Sealed this

Thirteenth Day of October, 1992

Attest:

DOUGLAS B. COMER

*Attesting Officer*    *Acting Commissioner of Patents and Trademarks*